United States Patent [19]
Gopalswamy et al.

[11] Patent Number: 5,823,309
[45] Date of Patent: Oct. 20, 1998

[54] MAGNETORHEOLOGICAL TRANSMISSION CLUTCH

[75] Inventors: Swaminathan Gopalswamy, Rochester Hills; Gary Lee Jones, Farmington Hills, both of Mich.

[73] Assignee: General Motors Corporation, Detroit, Mich.

[21] Appl. No.: 862,914

[22] Filed: May 23, 1997

[51] Int. Cl.$^6$ ................................................. F16D 35/00
[52] U.S. Cl. .................................... 192/21.5; 192/113.31
[58] Field of Search ................................ 192/21.5, 58.1, 192/58.2, 58.42, 113.31

[56] References Cited

U.S. PATENT DOCUMENTS

| | | | |
|---|---|---|---|
| 3,262,634 | 7/1966 | Monroe et al. | 192/113.31 |
| 4,623,052 | 11/1986 | Watanabe et al. | 192/21.5 |
| 4,624,349 | 11/1986 | Watanabe | 192/0.076 |
| 4,664,236 | 5/1987 | Stangroom | 192/35 |
| 4,803,628 | 2/1989 | Hayashi et al. | 364/424.1 |
| 4,871,049 | 10/1989 | Okita et al. | 192/21.5 |
| 4,895,233 | 1/1990 | Inoue et al. | 192/21.5 |
| 4,957,644 | 9/1990 | Price et al. | 252/62.52 |
| 4,967,887 | 11/1990 | Annacchino et al. | 192/21.5 |
| 5,094,328 | 3/1992 | Palmer | 192/21.5 |
| 5,137,128 | 8/1992 | Takei et al. | 192/21.5 |
| 5,147,004 | 9/1992 | Weisgerber et al. | 180/53.6 |
| 5,275,247 | 1/1994 | Weisgerber et al. | 180/53.6 |

OTHER PUBLICATIONS

Rabinow, J.—The Magnetic Fluid Clutch, AIEE Transactions, vol. 67, 1948.

Rabinow J.—Magnetic–Fluid Control Devices, presented at the SAE National Transportation Meeting, Cleveland, 1949.

Grau R. et al—The Magnetic Particle Clutch (A Versatile Control Element for Rocket Systems), Aerospace Engineering 1961.

Khairullin I.—Investigation of filler characteristics of electromagnetic ferromagnetic–powder devices. Soviet Electrical Engineering v.53, No.8, pp. 92–94, 1982.

Kordonski W.I.—Magnetorheological effect as a base of new devices and technologies, Journal of Magnetism and Magnetic Materials 122 (1993) pp. 395–398.

Ramakrishnan S. et al—Theory and performance of the disc–type electromagnetic particle clutch under continuous slip service, IEE Proc., 1980.

Varadakumari G. et al—Viscous torque of disc–type magnetic fluid slip clutches, IEE Proc., 1984.

Demchuk S.A.—Heat transfer in narrow gaps filled with magnetorheological suspensions, Journal of Magnetism and Magnetic Materials, No. 122, 1993, pp. 312–314.

(List continued on next page.)

*Primary Examiner*—Richard M. Lorence
*Attorney, Agent, or Firm*—Jeffrey A. Sedlar

[57] ABSTRACT

A magnetorheological clutch for controllable torque transmission includes a housing defining a cavity with a rotary input element carrying at least one input clutch plate extending radially in the cavity. A rotary output element carrying at least one output clutch plate extends radially into the cavity adjacent the input clutch plate with a gap defined between the input clutch plate and the output clutch plate. A core formed of magnetically permeable material has a pair of side plates extending radially across the housing. A coil effective to establish an electromagnetic field is carried against the core. Magnetorheological fluid is carried in the cavity within the gap and is responsive to the electromagnetic field that is established by the coil through the core so that torque is transferred from the input clutch plate to the output clutch plate through the magnetorheological fluid. A series of radially extending cooling fins are positioned in the cavity, radially inside the input clutch plate and the output clutch plate so that generated heat is dissipated through the cooling fins by exposure to a circulating coolant fluid flowing about the cooling fins that enters and exits the cavity through a coolant flow path. Heat expansion of the magnetorheological fluid is accommodated by a thermal expansion chamber.

20 Claims, 5 Drawing Sheets

OTHER PUBLICATIONS

Kordonsky V.I. et al—Physical properties of magnetizable structure–reversible media, Journal of Magnetism and Magnetic Materials 85 (1990) pp. 114–120.

Shulman Z.P. et al—Structure, physical properties and dynamics of magnetorheological suspensions, International Journal of Multiphase Flow, vol. 12, No. 6, pp. 935–955, 1986.

Shulman Z.P. et al—The mechanism of heat transfer in magnetorheological systems, International Journal of Heat and Mass Transfer, vol. 22, pp. 389–394, 1979.

Subaru Justy ECVT—Application of Features of Electromagnetic Clutch—The world first metal belt system Subaru ECVT—Nikkan Jidosha Shimbun, Jan. 24, 1987, translated by Bravis International, Mar. 30, 1987.

Japanese Motor Business 1st Quarter Issues, 1993, The Economist Intelligence Unit Limited 1993, p. 88.

Japanese Motor Business 2nd Quarter Issues, 1993, The Economist Intelligence Unit Limited 1993, pp. 48–49.

Automotive News from Japan, Apr. 1993 (from the on–line library reference service).

Nihon Kogyo—Article Titled "Nissan and FHI Develop New Automatic Transmission", Date Oct. 3, 1991, Ref No. WJ91.24322.

Magnetic Particle Clutch, Automobile Engineer, May 1954, pp. 181–186.

Cummins, G.F., A New Wet Clutch Fan Drive System, ASME Paper, Presented at the Design Engineering Conference & Show, Chicago, Apr., 1974.

5,823,309

1

MAGNETORHEOLOGICAL TRANSMISSION CLUTCH

TECHNICAL FIELD

The present invention relates to a magnetorheological transmission clutch and more particularly, to a magnetorheological clutch for controllable torque transmission through a contained fluid that is responsive to an applied magnetic field.

BACKGROUND OF THE INVENTION

In the typical automatic transmission equipped vehicle, a torque converter is used in transferring driving engine rotational motion to the transmission. A torque converter generally includes one or more rows of rotating blades that operate on a stream of moving fluid to transmit shaft torques. Commonly, torque is transferred in two phases of operation. These include one phase where output torque is multiplied and is greater than the input torque, and another phase where no torque multiplication occurs. The basic two phase torque converter was found to generally have undesirable inefficiencies under certain operating conditions and therefore, to improve efficiency a torque converter clutch is commonly used. The clutch is configured as a fluid operated friction device that is engageable to couple the input and output mechanisms of a torque converter, bypassing the fluid torque transmission mechanism when converter torque multiplication is no longer necessary. When the clutch is engaged, a substantially direct coupling is effected. In spite of the advancements made in torque converter technology, continuing efforts for efficiency advancements have led to investigations into alternative torque transmission devices for transmitting power from the engine to the drivetrain of a vehicle. In general, an alternate means of torque transmission is sought that has good performance characteristics, flexible controllability, and high efficiency operation. A magnetorheological fluid clutch is one possible candidate as a solution.

A magnetorheological fluid is a suspension of finely powdered iron or iron alloy in a fluid such as mineral oil or silicone. A magnetorheological fluid clutch may consist of this type of fluid suspension carried between clutch plates with an associated device providing a desired magnetic flux level across the clutch plates and the fluid. The clutch plates are typically made of a material with high permeability such as iron. When the magnetic flux is generated across the clutch plates and through the magnetorheological fluid, the suspended particles respond. The response is embodied as an attraction between the clutch plates and the magnetorheological fluid particles. This characteristic phenomenon combined with the internal magnetic attraction between the fluid particles results in torque transmission between the clutch plates. Many of the particle fluids that have been disclosed in the prior art have been dry powders. With the development and use of suspensions of powders in a fluid medium, studies were conducted into the rheology of particle fluids under a magnetic flux and consequently, the terminology of magnetorheological fluids has been coined.

Coupled devices, including clutches for use in environments such as an engine and transmission assembly of a vehicle, that operate with electro-magnetomechanical engagement devices are known wherein rotation of an output member relative to a driven input member is controlled by means of magnetic flux. The magnetic flux lines pass through the input and output members along with air or fluid gaps to transfer torque. In an automatic transmission environment, such a device must operate to transmit high torque levels over an adequately wide bandwidth and be robust enough for an extended life in a harsh environment. In order to benefit from the efficiency improvements potentially made possible with the use of a magnetorheological type clutch, a practical design adapted to replace a conventional torque converter continues to be needed.

SUMMARY OF THE INVENTION

An aspect of the present invention resides in providing a competitive magnetorheological fluid clutch for operating in the vehicle engine-to-automatic transmission torque conversion interface. In achieving this goal, the present invention seeks to provide a relatively compact device capable of transmitting the high levels of torque required over an adequate rotational speed bandwidth, while accommodating the relatively high levels of heat generated during automatic transmission operation. As a result, a magnetorheological transmission clutch is provided to satisfy the stringent operating conditions associated with automatic transmission applications.

In fulfillment of these objectives, the present invention preferably includes a rotary input element with at least one input clutch plate extending radially into a cavity of a housing. A rotary output element includes at least one output clutch plate that also extends radially into the cavity adjacent the input clutch plate, with a gap defined therebetween. A core formed of magnetically permeable material includes a pair of side plates that extend radially across the housing, on the sides of the clutch plates. A coil effective to establish an electromagnetic field is carried in the core radially outside the clutch plates in a nonrotating manner.

Magnetorheological fluid is carried in the cavity within the gap between the plates and is responsive to the electromagnetic field that is established by the coil through the core in the clutch plates. Torque is transferred from the input clutch plate to the output clutch plate through the magnetorheological fluid which tends to generate heat in the device. A series of radially extending cooling fins are positioned in the cavity inside the input and output clutch plates to assist in dissipating the generated heat. Since the prior art torque converter commonly employs fluid flow received from the transmission pump during operation, the present invention harnesses this fluid source as a circulating coolant fluid that enters and exits the cavity through a coolant flow path and flows about the cooling fins to assist in removing the internally generated heat.

In accordance with a preferred embodiment of the present invention described in greater detail herein, a thermal expansion chamber is provided within the cavity of a magnetorheological clutch. The thermal expansion chamber includes a compressible gas chamber separated by a diaphragm from the magnetorheological fluid used in operating the device. During operation, generated heat causes a temperature increase in the magnetorheological fluid and a corresponding volumetric expansion. The volumetric expansion is accommodated in the thermal expansion chamber where the expanded magnetorheological fluid moves the diaphragm to compress the gas. The thermal expansion chamber allows the fluid to expand without an excessive pressure rise and permits complete filling of the fluid cavity.

According to preferred aspects of the present invention, the core side plates includes axially directed openings so that circulating air within the associated automatic transmission bell housing can pass through the core and flow about the coil. The clutch plates preferably include a series of curved slots that are oriented to beneficially apply an inwardly directed force to the magnetorheological fluid in opposition to the centrifugal force of the rotating device. This develops a thorough mixing operation in the magnetorheological fluid to prevent particle congregation. Higher turbulence in the fluid also advantageously results in improved heat transfer characteristics for higher cooling rate operation and improved durability. The clutch plate slots also have added benefit of reducing eddy current generation. The core side plates also preferably include a series of radially directed wire cut slots advantageously reducing eddy current generation and thereby improving efficiency.

DESCRIPTION OF THE PREFERRED EMBODIMENT

Figure 1:
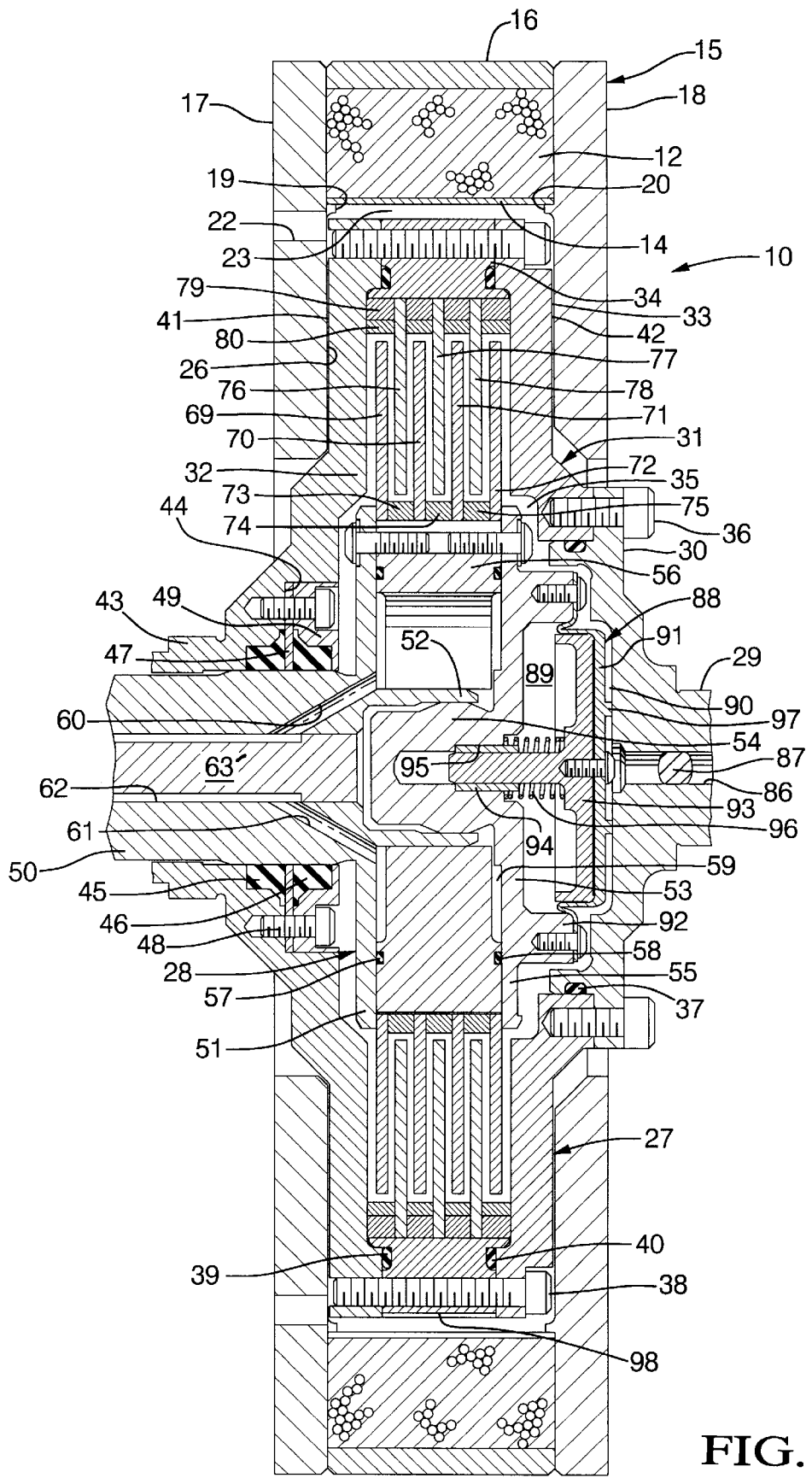
FIG. 1 is a cross sectional illustration of a magnetorheological transmission clutch according to an embodiment of the present invention.

Referring to the drawings, illustrated in FIG. 1 is a magnetorheological clutch designated as an assembly by reference numeral 10. In general, magnetorheological clutch 10 is designed to transmit relatively high torque across an adequately wide rotational speed band width for automatic transmission applications. The magnetorheological clutch 10 is intended to include durability enhancing features and elements that contribute to rejection of the relatively high levels of heat that are generated in the clutch during automatic transmission operation. Accordingly, the magnetorheological clutch 10 is designed to include aspects aimed at satisfying the relatively stringent operating conditions associated with automatic transmission applications. However, the unique features of the present invention are not so limited in application, and will find beneficial use in other magnetorheological clutch environments.

The magnetorheological clutch 10 includes a number of nonrotating or stationary elements that advantageously include coil 12. The coil 12 comprises a plurality of turns of wire wound on a bobbin 14 and is effective for establishing an electromagnetic field when supplied with an electrical current. Coil 12 is carried in stationary core 15 which includes a core ring 16 positioned around the radial outside of coil 12. Core ring 16 extends between and engages a pair of annular core side plates 17 and 18. The core ring 16 and sides plates 17 and 18 are made of an efficient magnetic permeable material such as steel or iron for carrying the electromagnetic field established by coil 12. The core side plates 17 and 18 each include an annular ledge 19 and 20 respectively, that engage the inside of bobbin 14 and assist in radially aligning the side plates 17 and 18. The core 15 is held together by a conventional fastening means (not illustrated).

Figure 2:
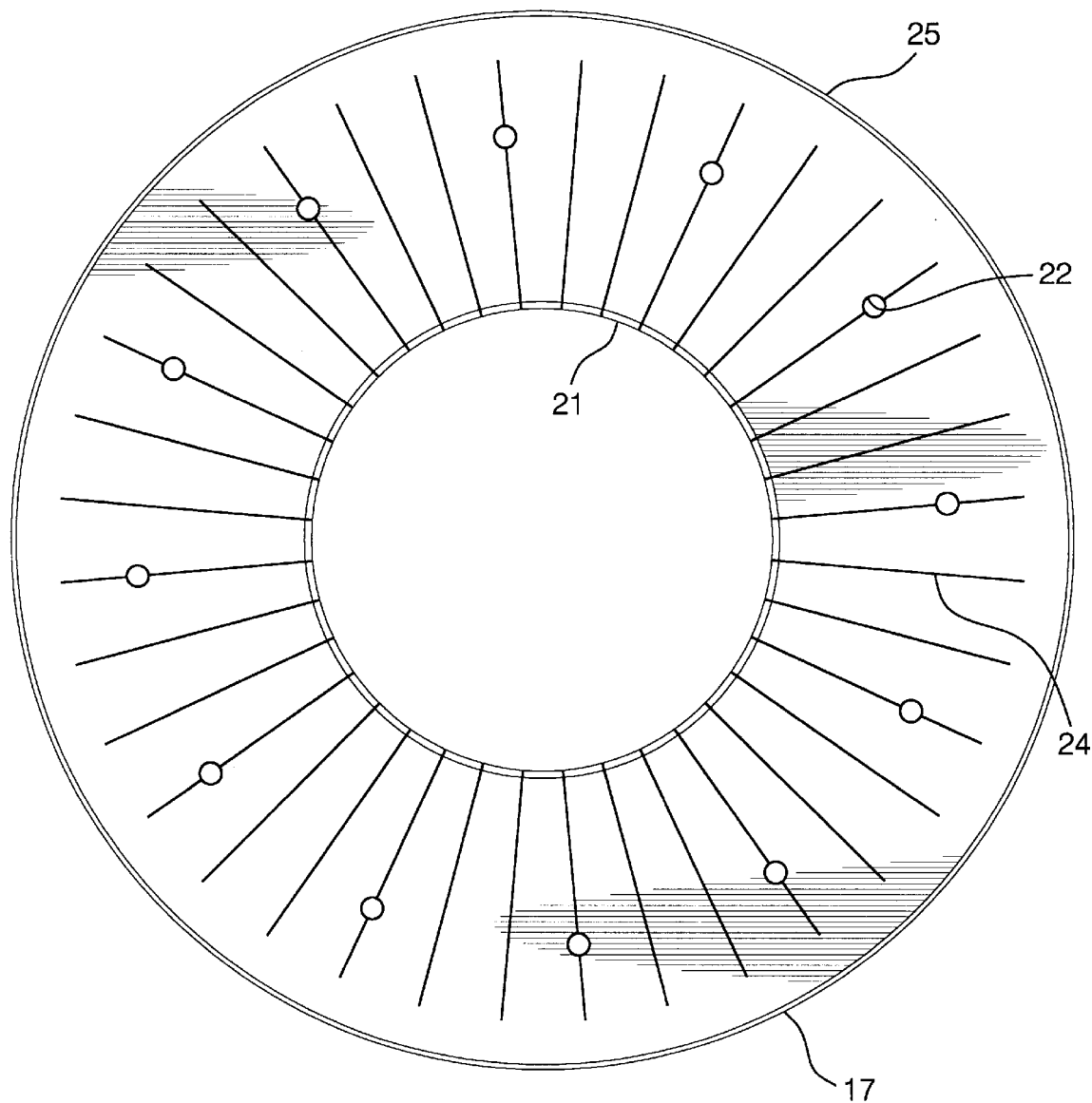
FIG. 2 is a detailed illustration of a core side plate of the magnetorheological clutch of FIG. 1.

Referring to FIG. 2, the side plate 17 is illustrated in greater detail, and for purposes of the present invention, the side plate 18 is similarly constructed. Side plate 17 is generally a large annular shaped washer-like device with a central opening 21. Side plate 17 includes a number of axial directed openings 22 that are distributed in a circular pattern around the side plate 17 and as seen in FIG. 1, are positioned radially inside the bobbin 14 so that circulating air can pass through the axial openings 22 and through the air gap 23 expelling heat therefrom, which is commonly generated by energization of the coil 12. Also shown in FIG. 2 is the series of radially directed wire cut slots 24 that are formed completely through the thickness of the side plate 17 from the central opening 21 and radially outward across a substantial portion of the side plate 17, stopping short of the outer periphery by a selected distance. The wire cuts 24 include individual cuts that intersect each of the axial openings 22 and also include a pair of wire cut slots that extend in-between each adjacent pair of axial openings 22.

The wire cut slots 24 act to improve the effect of eddy currents generated in the side plate 17 under the effect of the clutch's rotating elements on the established electromagnetic field. Induced voltages that cause localized eddy currents in core material are known to contribute to energy loss in the form of heat in a typical magnetic circuit. In the present embodiment, interrupting the localized eddy current path through means of the wire cut slots 24 effects a decrease in heat generation and therefore, reduces the cooling load requirements needed to maintain efficient operation of the magnetorheological clutch 10. Additionally, during manufacturing the side plate 17 is preferably annealed through exposure to heat source raising its temperature up to approximately 1550° F. in an inert environment and then providing exposure to hydrogen for approximately 15 minutes with subsequent slow cooling. This improves the magnetic properties of the core 15.

Referring again to FIG. 1, the core 15, and in particular the side plates 17 and 18 extend radially inward from the coil 12 such that an annular space 26 with a rather long radial distance is provided for receiving the rotary components of the magnetorheological clutch 10 within the core 15. The rotary elements include input element 27 and output element 28. The input element 27 includes a driven input shaft 29 for engagement with an associated vehicle engine (not illustrated), and includes an integrally formed connecting flange 30. The connecting flange 30 is engaged with a housing 31 formed by housing sections 32 and 33 and an interposed input ring 34. The housing 31 substantially defines a cavity 35. The outer surface of the input ring 34 includes grooves, such as groove 98, for generating air movement in the air gap 23 for increased cooling effect.

The connecting flange 30 of the input shaft 29 is fastened to the housing section 31 by a plurality of fasteners 36 with an annular seal 37 positioned to assure fluid tight integrity of the cavity 35. A plurality of fasteners 38 also secure the housing section 32 to the housing section 31 with the input ring 34 clamped therebetween, with a pair of seals 39 and 40 ensuring fluid tight integrity at the input ring housing section interfaces. The housing sections 31 and 32 are formed of a material with good magnetic permeability, and the input ring 34 is formed of a nonmagnetic material such as stainless steel. Likewise, the fasteners 38 are nonmagnetic. The housing sections 31 and 32 are positioned within the annular space 26 establishing a large flux transfer area at the air gaps 41 and 42. Providing the side plates 17 and 18 in an overhanging manner about the rotating elements of the magnetorheological clutch 10 permits reducing the relative tolerance requirements in maintaining the width of air gaps 41 and 42.

The housing section 32 includes an axially directed radially inner flange 43 with an adjacent step 44. A seal assembly including a pair of seals 45 and 46 carried on a support 47 is secured in the step 44 by a plurality of fasteners 48. A seal ring 49 is fixed adjacent the seal support 47 and over the seal 46 by the fasteners 48. The flange 43 presents an opening to the cavity 35 through which output shaft 50 of output element 28 extends. The output shaft 50 engages the seals 45 and 46 providing fluid tight closure at the output shaft housing interface. The output shaft 50 includes an integral plate 51 that extends radially outward in cavity 35 and includes an integral cylindrical extension 52 that extends axially into the cavity 35. An output plate 53 includes an axial shaft 54 that is received within the cylindrical extension 52 of the input shaft 50 and a radially extending flange 55 that is formed integrally with the axial shaft 54. The output shaft 50 is adapted for connection to an automatic transmission of the associated vehicle.

A cooling ring 56 is captured between the flange 51 of output shaft 50 and the flange 55 of output plate 53. The cooling ring 56 is clamped between the flanges 51 and 55 by a plurality of common fastening devices. A pair of seals 57 and 58 provide a fluid tight seal at the cooling ring flange interfaces separating out a cooling chamber 59 within the cavity 35. Flow is directed into the cooling chamber 59 through a cooling channel 60 and is directed outward from the cooling chamber 59 through cooling channel 61. The cooling channels 60 and 61 intersect an axial opening 62 formed through the output shaft 50. A plug 63 is positioned in the axial opening 62 and includes a pair of slots for maintaining flow separation between input and output directed flow to and from the cooling chamber 59. The output shaft 59 is adapted to receive fluid flow from the associated transmission pump in a manner similar to that employed with prior art torque converters. However, the transmission fluid flow in this case is provided solely for cooling purposes.

Figure 3:
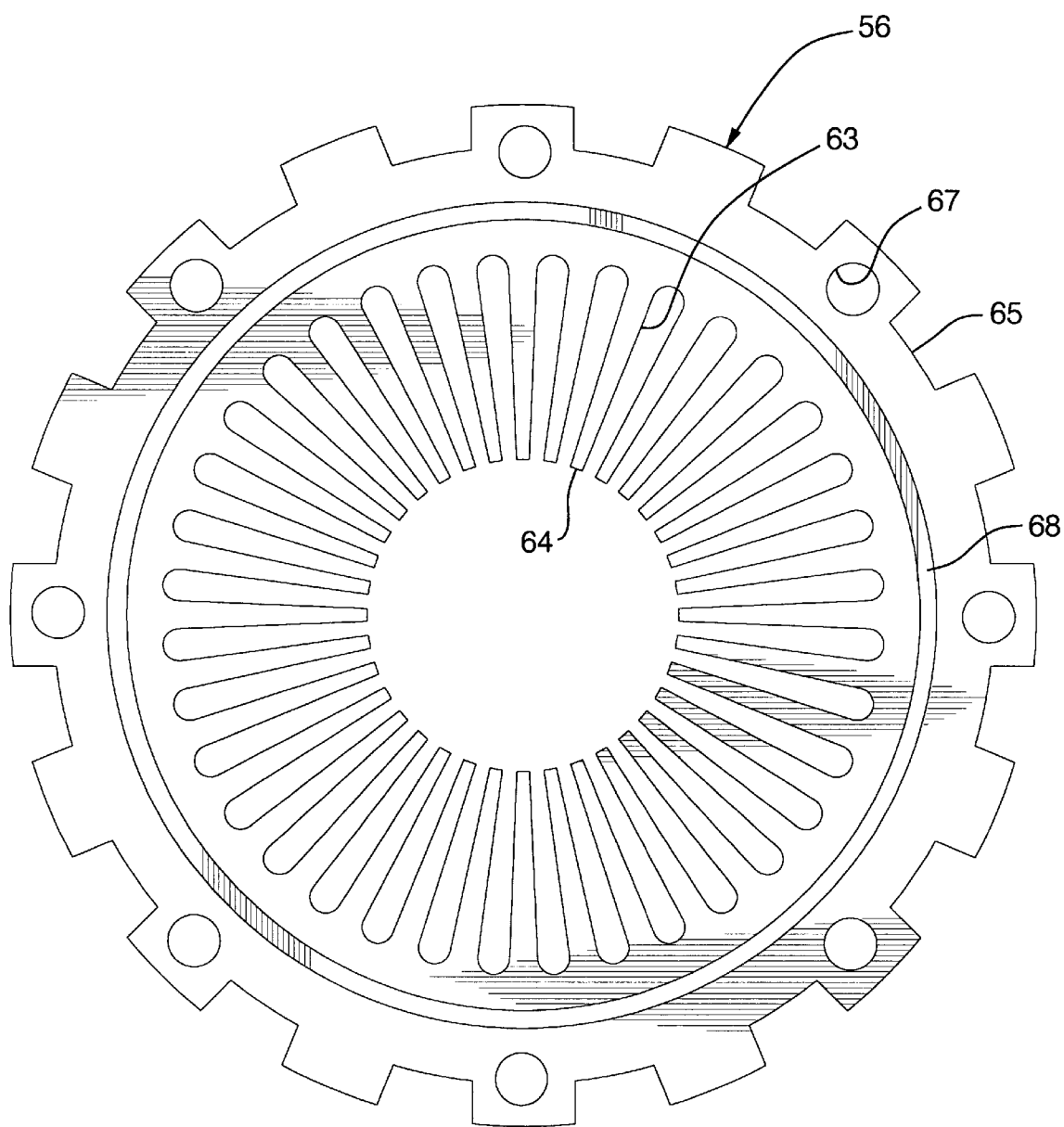
FIG. 3 is a detailed illustration of the input ring unit of the magnetorheological clutch of FIG. 1.

Referring to FIG. 3, cooling ring 56 is illustrated in greater detail. The cooling ring 56 includes a plurality of radial cooling fins 63 that are directed inwardly toward terminal ends that cooperate to define a center opening 64. Cooling ring 56 also includes a number of axially directed slots 65, with a number of fastener openings 67 formed between adjacent pairs of slots 65. A seal groove 68 is provided for receiving the seal 57 as seen in FIG. 1. Referring again to FIG. 1, it can be seen that when the cooling ring 56 is assembled in the magnetorheological clutch 10, the cylindrical extension 52 of the output shaft 50 is received within the center opening 64 of the cooling ring 56.

A set of four output clutch plates 69–72 are received over the outer periphery of the cooling ring 56 and are keyed within the axial slot 65 for rotation in concert with the output element 28. The output clutch plates 69–72 are spaced apart by three spacer rings 73–75 with the output clutch plates and spacer rings clamped between the flanges 51 and 55 of output element 28. A set of three input clutch plates 76–78 extend radially in-between adjacent output clutch plates and are carried at their outer periphery by the input ring 34. The input clutch plates 76–78 are spaced apart by a series of four spacer rings 79 and nonmagnetic rings 80. Depending on the required torque capacity and the operational bandwidth and drag limitations of the application, the number of input and output clutch plates will be varied.

Figure 4:
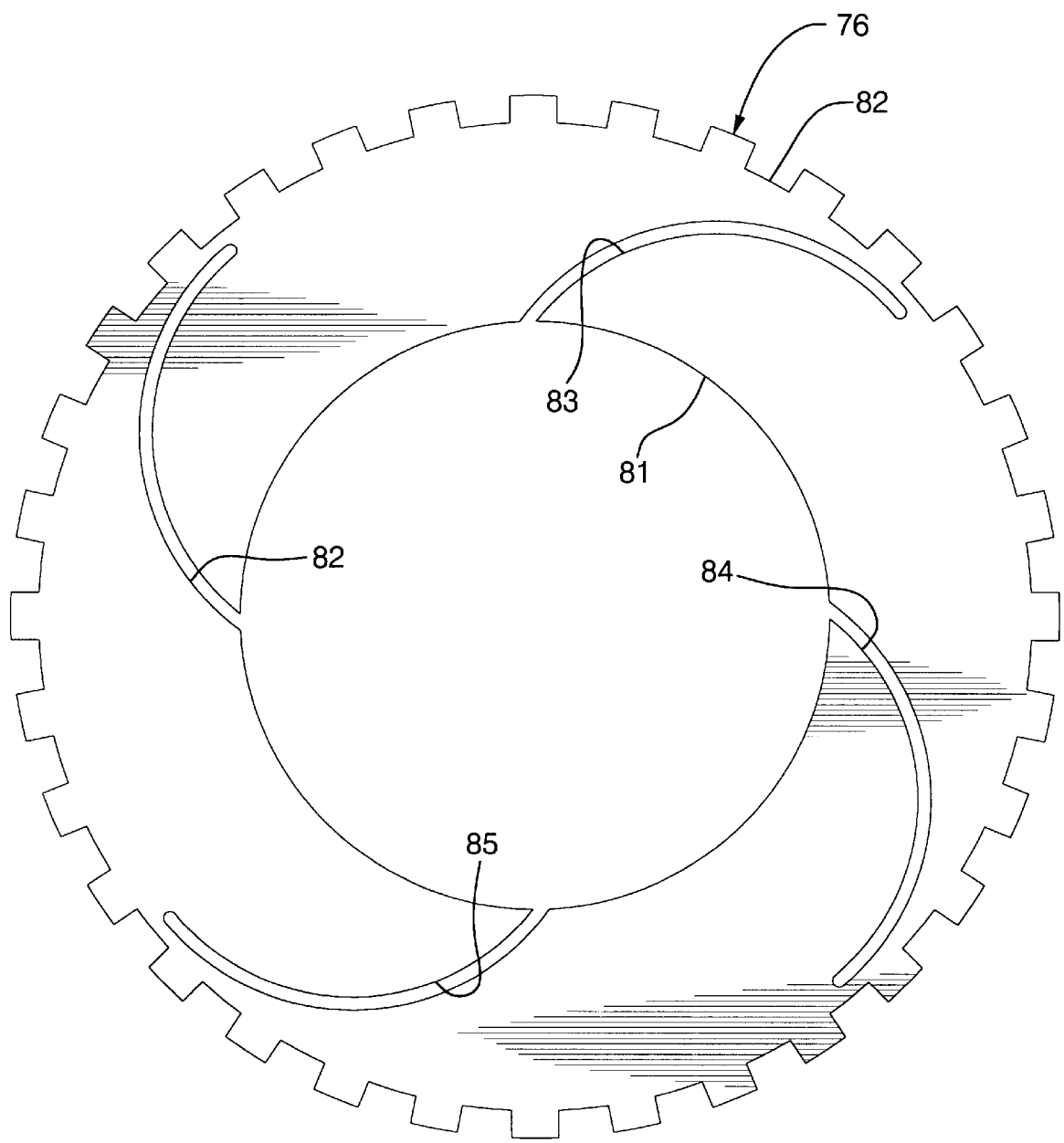
FIG. 4 is a detailed illustration of an input clutch plate of the magnetorheological clutch of FIG. 1.

Referring to FIG. 4, a detailed illustration of the input clutch plate 76 is shown. Input clutch plate 76 includes a center opening 81 sized sufficiently to provide rotatable clearance about the spacer ring 73 and includes a series of axially directed slots 82 for keyed engagement with the input ring 34. Four curved slots 82–85 are cut completely through the thickness of input clutch plate 76 and extend from the center opening 81 in a convoluted path radially outward and are shaped to impose an inwardly directed force on a fluid positioned about the input clutch plate 76 in opposition to centrifugal force, during rotation of the magnetorheological clutch 10, imparting a thorough mixing action to the contained fluid. Accordingly, a magnetorheological fluid is contained between the input and output clutch plates and completely fills the cavity 35. The fluid is introduced through fill opening 86 which is provided at input shaft 29. Fill opening 86 is subsequently sealed with a plug 87.

Magnetorheological fluids comprising a suspension of solid particles in a selected liquid are known wherein the fluid's yield stress must be exceeded in order to initiate flow. When the fluid is exposed to a magnetic field the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by controlling the volume fraction of suspended particles. Magnetorheological fluids useful as in the present invention are described in detail by commonly assigned U.S. patent application Ser. No. 08/629,249 now U.S. Pat. No. 5,667,715 entitled "Magnetorheological Fluids," filed Apr. 8, 1996, and which is specifically incorporated herein by reference. For purposes of the present invention, the magnetorheological fluid contained in cavity 35 carries a selected volume percent of solid particles that permits slippage between the input clutch plates 76–78 and the output clutch plates 69–72 when the clutch is partially engaged during acceleration and transmission shifting events. An increased torque transfer is effected between input and output plates as the clutch is engaged through energizing the coil 12, and substantially complete coupling is provided when the clutch is fully engaged with negligible slippage between the input and output plates. The coil 12 is supplied with a variable current signal through a conductor (not illustrated).

Figure 5:
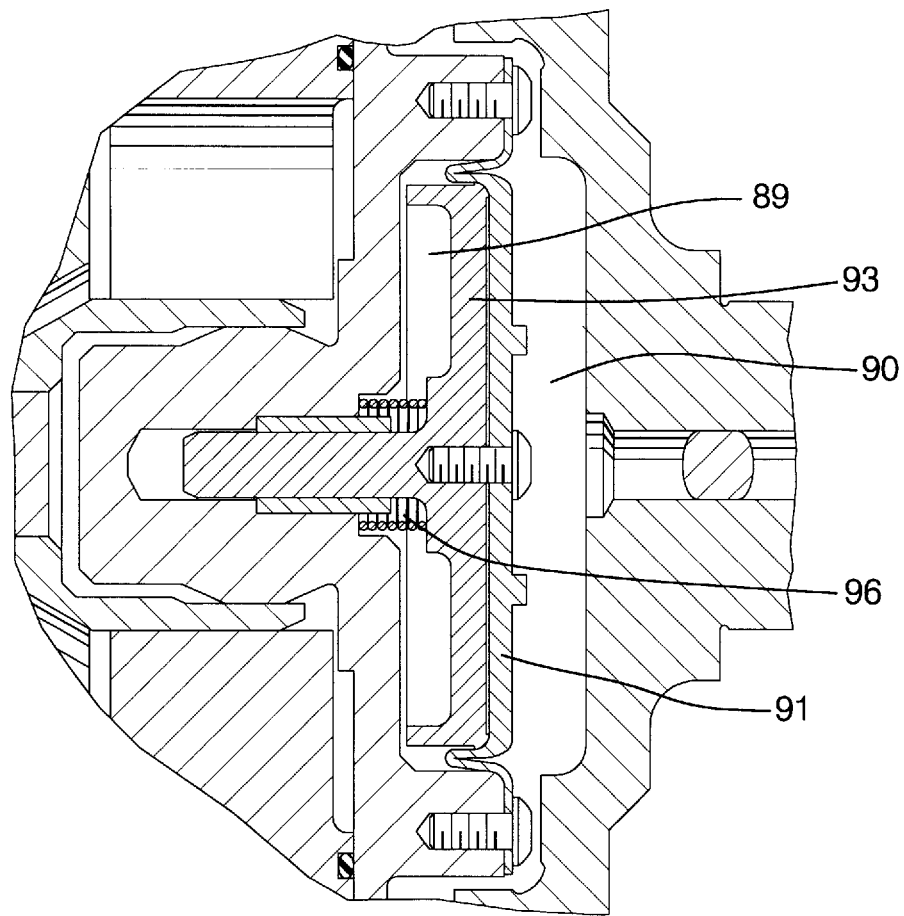
FIG. 5 is a detail illustration of the thermal expansion chamber of the magnetorheological clutch of FIG. 1 shown in a heat compensation position.

During operation of the magnetorheological clutch 10, heat generation will tend to cause a temperature increase and a corresponding expansion of the magnetorheological fluid contained within cavity 35. In order to permit substantial filling of the cavity 35 during assembly, a means for accommodating the thermal expansion is provided. A thermal expansion chamber 88 is located between output plate 53 and connecting flange 30. The thermal expansion chamber 88 is segregated into gas chamber 89 and magnetorheological fluid chamber 90. The chambers 89 and 90 are separated by a flexible elastomeric diaphragm 91 that is secured to the cylindrical extension 92 of output plate 53. The diaphragm 91 is backed by a piston 93 that is slidably supported in a guide 94 positioned in axial opening 95 of axial shaft 54. A spring 96 extends between the piston 93 and output plate 53 biasing an annular rib 97 of diaphragm 91 against the connecting flange 30. Thermal expansion of the magnetorheological fluid carried within cavity 35 moves the diaphragm 91 and piston 93 to compress the gas chamber 89 and spring 96 expanding the magnetorheological fluid chamber 90 in accommodating thermal expansion as seen in FIG. 5.

In operation, the magnetorheological clutch 10 provides torque transfer between the input element 27 and the output element 28 through the contained magnetorheological fluid. When the coil 12 is supplied with electrical current from an external source that communicates with the magnetorheological clutch 10 through a conventional interface such as slip rings (not illustrated), an electromagnetic field is established. The magnetic circuit passes through the core 15, across the air gaps 41 and 42, through the housing sections 31 and 32, across the output clutch plates 69–72 and the input clutch plates 76–78, and across the magnetorheological fluid in cavity 35 between the clutch plates. The magnetic field provides the necessary coupling in an energy conversion process between the electrical current carried in the coil 12 and mechanical rotation of the output element 28 relative to the input element 27. By varying the current level, smooth transmission shifting, gradual torque transfer increases, and substantial lock-up between the input and output elements is alternately achieved. Transmission fluid is pumped as coolant through the magnetorheological clutch 10, and aspects of the core and clutch plates contribute to efficient heat management characteristics. In addition, the integration of a thermal expansion chamber provides maximized fluid carrying capabilities. Accordingly, an efficient and durable magnetorheological clutch is provided.

What is claimed is :

1. A magnetorheological clutch for controllable torque transmission comprising:
a housing defining a cavity;
a rotary input element with at least one input clutch plate extending in the cavity;
a rotary output element with at least one output clutch plate extending in the cavity adjacent the input clutch plate with a gap defined between the input clutch plate and the output clutch plate;
a core formed of magnetically permeable material;
a coil effective to establish an electromagnetic field and carried against the core;
a magnetorheological fluid carried in the cavity and within the gap wherein the fluid is responsive to the electromagnetic field that is established by the coil through the core so that torque is transferred from the input clutch plate to the output clutch plate through the magnetorheological fluid; and
a thermal expansion chamber in the cavity with a compressible gas chamber in the thermal expansion chamber separated from a magnetorheological fluid chamber in the thermal expansion chamber by a diaphragm so that expansion of the magnetorheological fluid is accommodated by movement of the diaphragm to compress the gas.

2. A magnetorheological clutch according to claim 1 further comprising a fill opening registering with the magnetorheological fluid chamber wherein the fill opening is securely sealed.

3. A magnetorheological clutch according to claim 1 further comprising a piston slidably supported in the housing wherein the diaphragm is positioned against the piston.

4. A magnetorheological clutch according to claim 2 wherein the piston is supported by a cylindrical guide that is fixed in the housing and wherein a spring biases the piston against the diaphragm to compress the magnetorheological fluid chamber.

5. A magnetorheological clutch according to claim 4 further comprising a series of radially extending cooling fins positioned in the cavity near the input clutch plate and the output clutch plate wherein generated heat is dissipated through the cooling fins by exposure to a circulating coolant fluid that enters and exits the cavity through a coolant flow path and flows about the cooling fins.

6. A magnetorheological clutch according to claim 1 further comprising an input ring supporting the input clutch plate wherein the input ring includes grooves that assist in circulating air about the coil.

7. A magnetorheological clutch according to claim 6 further comprising a series of radially extending cooling fins positioned in the cavity near the input clutch plate and the output clutch plate wherein generated heat is dissipated through the cooling fins by exposure to a circulating coolant fluid that enters and exits the cavity through a coolant flow path and flows about the cooling fins.

8. A magnetorheological clutch according to claim 7 wherein the input clutch plate and the output clutch plate extend radially, and the cooling fins extend radially and are positioned radially inside the input clutch plate and the output clutch plate.

9. A magnetorheological clutch for controllable torque transmission comprising:
a housing defining a cavity;
a rotary input element with at least one input clutch plate extending radially in the cavity;
a rotary output element with at least one output clutch plate extending radially in the cavity adjacent the input clutch plate with a gap defined between the input clutch plate and the output clutch plate;
a core formed of magnetically permeable material and having a pair of side plates extending radially across the housing;
a coil effective to establish an electromagnetic field and carried against the core;
a magnetorheological fluid carried in the cavity and within the gap wherein the fluid is responsive to the electromagnetic field that is established by the coil through the core so that torque is transferred from the input clutch plate to the output clutch plate through the magnetorheological fluid; and
a series of radially extending cooling fins positioned in the cavity and radially inside the input clutch plate and the output clutch plate wherein generated heat is dissipated through the cooling fins by exposure to a circulating coolant fluid that enters and exits the cavity through a coolant flow path and flows about the cooling fins.

10. A magnetorheological clutch according to claim 9 further comprising a thermal expansion chamber in the cavity with a compressible gas chamber in the thermal expansion chamber separated from a magnetorheological fluid chamber in the thermal expansion chamber by a diaphragm so that expansion of the magnetorheological fluid is accommodated by movement of the diaphragm to compress the gas.

11. A magnetorheological clutch according to claim 9 wherein the core side plates include axial openings so that circulating air can pass through the axial openings to the coil.

12. A magnetorheological clutch according to claim 9 wherein at least one of the input and output clutch plates includes a series of curved slots shaped to drive the magnetorheological fluid inwardly against centrifugal force.

13. A magnetorheological clutch according to claim 9 wherein the core side plates include a series of radially extending slots intersecting the axial openings and enhancing magnetic characteristics of the core.

14. A magnetorheological clutch for controllable torque transmission comprising:
a housing defining a cavity;
a rotary input element with an input shaft and at least one input clutch plate extending radially in the cavity;

a rotary output element with an output shaft and at least one output clutch plate extending radially in the cavity adjacent the input clutch plate with a gap defined between the input clutch plate and the output clutch plate, and wherein the input clutch plate and the output clutch plate exist in an annular space defining an open center area;

a core formed of magnetically permeable material and having a pair of side plates extending radially across the housing so that the housing is positioned between the core and the input and output clutch plates;

a coil effective to establish an electromagnetic field and carried in the core radially outside the input clutch plate and the output clutch plate;

a magnetorheological fluid carried in the cavity and within the gap wherein the fluid is responsive to the electromagnetic field that is established by the coil through the core, the housing, the input clutch plate and the output clutch plate, wherein torque is transferred from the input clutch plate to the output clutch plate through the magnetorheological fluid; and a series of radially extending cooling fins positioned in the cavity and radially inside the input clutch plate and the output clutch plate within the open center area, wherein generated heat is dissipated through the cooling fins by exposure to a circulating coolant fluid that enters and exits the cavity through a coolant flow path that extends through the output shaft so that the coolant fluid flows about the cooling fins.

15. A magnetorheological clutch according to claim 14 further comprising a thermal expansion chamber in the cavity with a compressible gas chamber in the thermal expansion chamber separated from a magnetorheological fluid chamber in the thermal expansion chamber by a diaphragm so that expansion of the magnetorheological fluid is accommodated by movement of the diaphragm to compress the gas.

16. A magnetorheological clutch according to claim 14 wherein the core side plates include axial openings so that circulating air can pass through the axial openings to the coil.

17. A magnetorheological clutch according to claim 14 wherein at least one of the input and output clutch plates includes a series of curved slots shaped to drive the magnetorheological fluid inwardly against centrifugal force.

18. A magnetorheological clutch according to claim 14 wherein the core side plates include a series of radially extending slots intersecting the axial openings and enhancing magnetic characteristics of the core.

19. A magnetorheological clutch according to claim 15 wherein the input shaft includes a fill opening that opens to the thermal expansion chamber wherein magnetorheological fluid is introduced to the cavity by displacing the diaphragm and admitting the magnetorheological fluid through the fill opening.

20. A magnetorheological clutch for controllable torque transmission comprising:

a housing defining a cavity;

a rotary input element with an input shaft and at least one input clutch plate extending radially in the cavity;

a rotary output element with an output shaft and at least one output clutch plate extending radially in the cavity adjacent the input clutch plate with a gap defined between the input clutch plate and the output clutch plate, and wherein the input clutch plate and the output clutch plate exist in an annular space defining an open center area;

a core formed of magnetically permeable material and having a pair of side plates extending radially across the housing so that the housing is positioned between the core and the input and output clutch plates wherein the core side plates include axial openings so that circulating air can pass through the axial openings to the coil, and wherein the core side plates include a series of radially extending slots intersecting the axial openings and enhancing magnetic characteristics of the core;

a coil effective to establish an electromagnetic field and carried in the core radially outside the input clutch plate and the output clutch plate;

a magnetorheological fluid carried in the cavity and within the gap wherein the fluid is responsive to the electromagnetic field that is established by the coil through the core, the housing, the input clutch plate and the output clutch plate, wherein torque is transferred from the input clutch plate to the output clutch plate through the magnetorheological fluid, and wherein at least one of the input and output clutch plates includes a series of curved slots shaped to drive the magnetorheological fluid inwardly against centrifugal force;

a series of radially extending cooling fins positioned in the cavity and radially inside the input clutch plate and the output clutch plate within the open center area, wherein generated heat is dissipated through the cooling fins by exposure to a circulating coolant fluid that enters and exits the cavity through a coolant flow path that extends through the output shaft so that the coolant fluid flows about the cooling fins; and a thermal expansion chamber in the cavity with a compressible gas chamber in the thermal expansion chamber separated from a magnetorheological fluid chamber in the thermal expansion chamber by a diaphragm so that expansion of the magnetorheological fluid is accommodated by movement of the diaphragm to compress the gas wherein controllable torque transmission is effected between the input shaft and the output shaft by transmitting torque between the input clutch plate and the output clutch plate through the magnetorheological fluid wherein an attraction is effected between suspended particles in the magnetorheological fluid and the input and output clutch plates under influence from the electromagnetic field established by the coil.

* * * * *